Oct. 2, 1962 H. C. FISCHER 3,056,879
ELECTRIC HEATING ELEMENT FOR WATER TANKS AND METHOD
Filed March 24, 1960 2 Sheets-Sheet 1
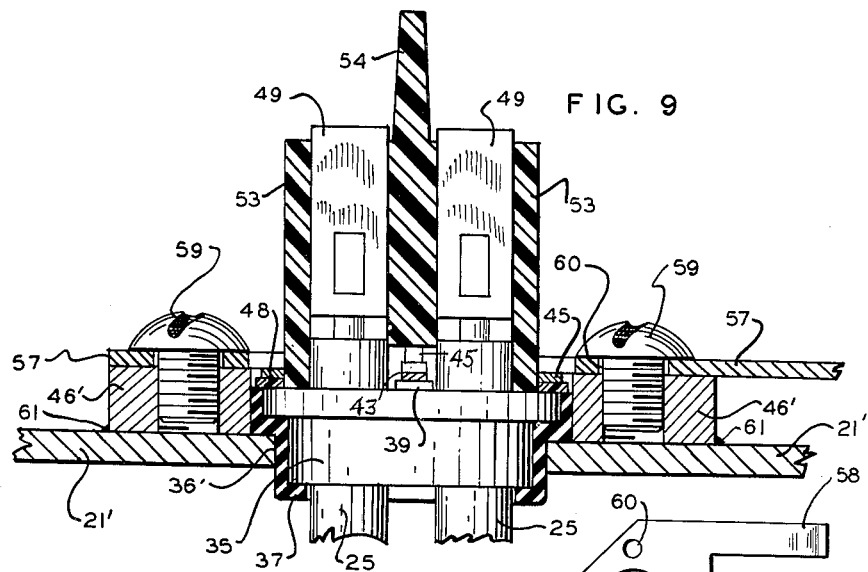
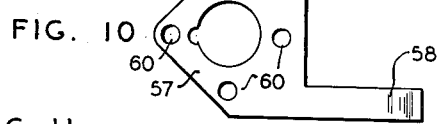
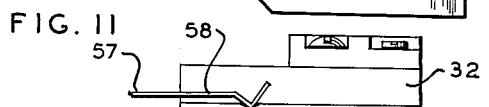
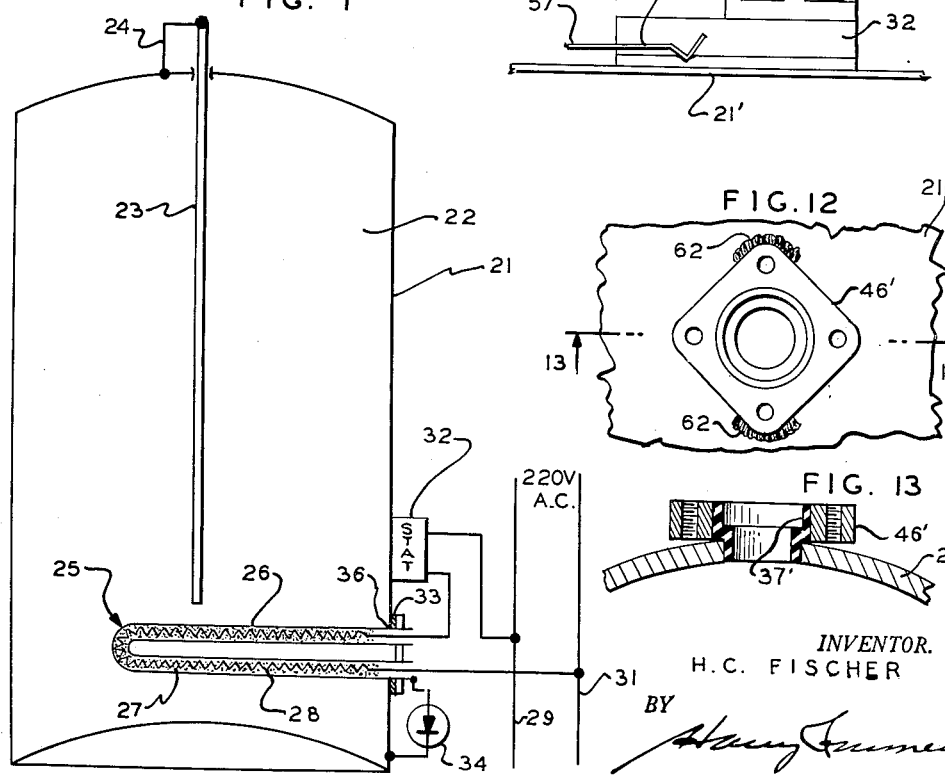
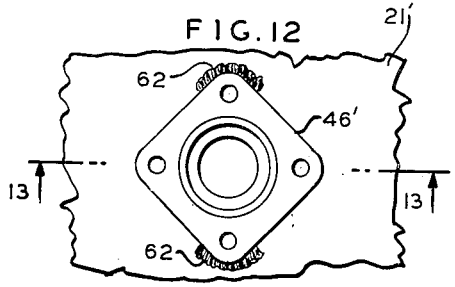
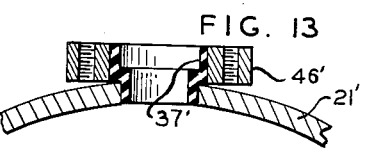
INVENTOR.
H.C. FISCHER
BY
ATTORNEY Oct. 2, 1962 H. C. FISCHER 3,056,879
ELECTRIC HEATING ELEMENT FOR WATER TANKS AND METHOD
Filed March 24, 1960 2 Sheets-Sheet 2
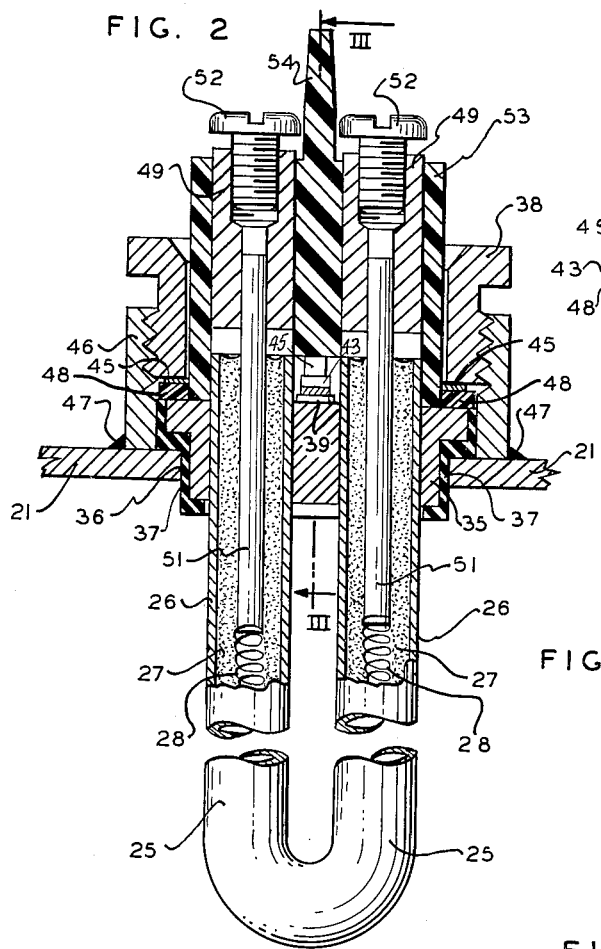
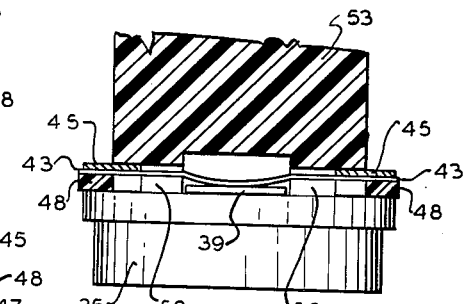
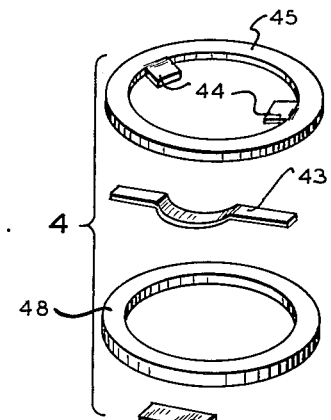
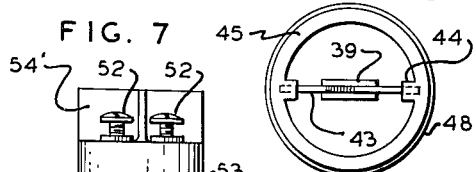
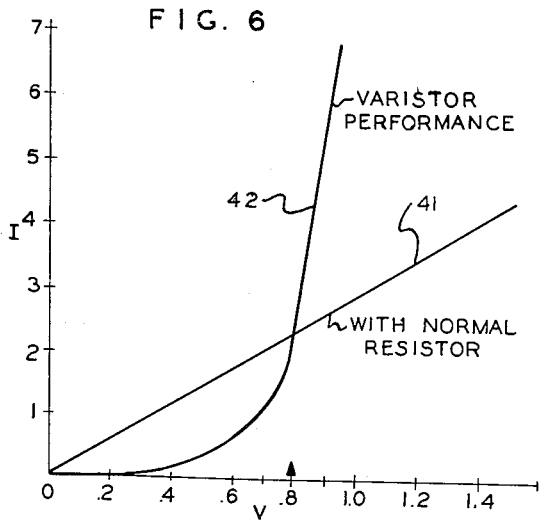
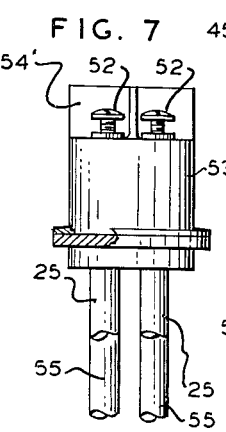
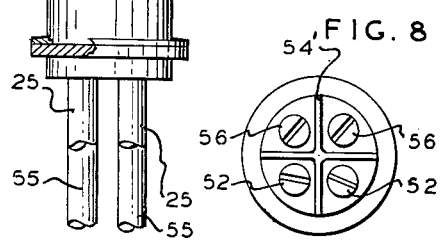
INVENTOR.
H. C. FISCHER
BY
ATTORNEY

3,056,879
ELECTRIC HEATING ELEMENT FOR WATER TANKS AND METHOD

Harry C. Fischer, Montville, N.J., assignor to Thermo-Craft Electric Corporation, Montville, N.J., a corporation of New Jersey
Filed Mar. 24, 1960, Ser. No. 17,306
16 Claims. (Cl. 219—38)

This invention relates to electric immersion heaters and, more particularly, to such associated with means for protecting the water vessel or tank against corrosive action and an improved method.

An object of my invention is to provide, in combination with a vessel to contain liquid, an electric heater of the sheathed immersion type extending thereinto, means insulatingly mounting said element on a wall of said vessel, an element electro-positive or anodic with respect to and secured to the inside of said vessel, and a resistor of varying resistance value for allowing only a predetermined voltage gradient between said heater sheath and said vessel.

A further object of my invention is to utilize a selenium cell for bleeding off the positive charge on a hot water heater of the immersion type associated with a corrosion-inhibiting anode which develops a protective current, whereby the charge is bled off at a controlled voltage and conserves the protective current while still inhibiting corrosion.

An additional object of my invention is to produce an immersion type of electric hot water heater for vessels wherein an improved construction allows for a smaller inserting aperture, provided by operating said heater at such high power that lime deposits are eliminated by thermal shock at the beginning of each heating cycle.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIG. 1 is a wiring digram showing how the heater embodying my invention is incorporated in a water tank, FIG. 2 is an enlarged fragmentary view, partly in side elevation and partly in section on the mid-plane of the heating element showing how it is mounted in the tank, FIG. 3 is a fragmentary view, with parts in elevation and parts in section on the line III—III of FIG. 2, in the direction of the arrows, FIG. 4 is an exploded view of the elements used in connection with the mounting of a selenium cell for, during operation, bleeding off the developed positive charge from the heating element, FIG. 5 is a plan view of the elements illustrated in FIG. 4 when assembled in place, FIG. 6 is a graph comparing the resistance of a selenium cell, which I term a "varistor," with a resistor of conventional structure, FIG. 7 is an elevational view of a modified form of heating element, employing two instead of one heating loop, FIG. 8 is a top view or plan of the heating element of FIG. 7, FIG. 9 is a fragmentary view corresponding generally to, and to the scale of, FIG. 2, but showing another embodiment of my invention, FIGURE 10 is a plan, to a scale smaller than that of FIGURE 9, of the bracket of FIGURE 9, arms of which may engage a thermostat, as illustrated in FIGURE 11, FIGURE 11 is a fragmentary elevational view, to the scale of FIGURE 10, showing how said bracket may hold a thermostat against the wall of a tank, FIGURE 12 is a plan showing a construction alternate to that of FIGURE 9, wherein a boss is attached to a cylindrical portion of a tank, rather than to a flat portion, FIGURE 13 is a sectional view on the line XIII—XIII of FIGURE 12, in the direction of the arrows.

For some time electric water heater tanks or vessels have been provided with an anodic element taking the form of either a highly positive metal such as magnesium, forming a sacrificial anode, or in the form of an insoluble anode maintained positive by an auxiliary source of unidirectional current and which is immersed in the water in the interior of the tank. Such anodes are installed to protect the interior wall against the formation of rust, in the event the protective glass lining is faulty.

A sacrificial anode, such as a magnesium rod, accomplished this by setting up galvanic current between itself and the unprotected portion of the tank wall, thus making the magnesium electropositive with respect to the tank wall which, during such operation, become coated with a protective film of hydrogen. This protective film deposit is not permanent and in order to be effective the action must be continuous.

In using a magnesium rod in a water heater having a conventional heating element, it has been found that the rod was rapidly consumed because of the galvanic action produced. In order to protect such a rod from too-rapid depreciation with consequent loss of protection to the tank, relatively early in its useful life, it has been proposed to electrically insulate the heating element from the tank wall, to thereby break the path for the galvanic current between the rod and the heating element. Such insulating proved satisfactory from the standpoint of magnesium rod life; however, a certain amount of galvanic flow continued between the magnesium rod and the heating element, the current completing its circuit between the heating element and the adjacent parts of the tank wall by passing through the water. This resulted in serious corrosion of the sheath of the heating element and consequent early failure thereof.

In accordance with my invention, I connected an insulated heating element to the tank wall through a variable resistor, to thereby avoid the disadvantages inherent in both the insulated and non-insulated heating element, and operate such element at such high power and high rate of heat transfer to the water that any lime deposit thereon is broken off during operation.

Referring now to the drawings in detail, and first considering FIGURE 1, there is shown somewhat diagrammatically a tank or vessel 21 containing liquid such as water and in which is mounted a protective anode rod 23 which may be formed of magnesium or of platinum-faced or platinum-plated tantalum or titanium. If formed of the latter, auxiliary power means is employed to give it a positive potential as compared with the tank 21. The wall of the tank 21 is desirably interiorly coated with glass and the purpose of the protective anode 23 is to avoid corrosion at imperfections in the glass coating. The rod or anode 23 is electrically connected to the wall of the tank, as indicated at 24.

The electrical heater, heating loop or element 25 of the immersion type is shown passing through a hole 36 in a wall of the tank 21. The hole 36 need be not larger than to take a relatively small connecting collar on the loop 25 and a gasket 37 thereabout, as no allowance need be made for lime encrustation on the sheath 26, for reasons to be explained. The heater 25 consists of a sheath 26 which may be of copper or other durable metal enclosing insulating material 27, such as magnesia, in which is embedded a resistance heating coil 28 which may be made of Nichrome. Power to the coil 28 is supplied from lines 29, 31 through a conventional thermostat 32 receiving heat from the slide of the tank. The sheath 26 of the heater, which is insulated from the tank as indicated as 33, is electrically connected to said tank through what I term a variable resistance element 34, which is desirably in the form of a selenium cell.

The current path, when the heater is connected to the tank through the resistor 34, offers a controlled resistance which makes the greater portion of the protective current flow to the tank wall instead of the copper sheath of the heater. If the heater 25 were grounded to the tank 21, most of the galvanic or protective current would be wasted on the copper heater sheath 26, little going to the tank wall because of the high resistance of the glass coating.

Referring now to the embodiment of my invention illustrated in FIGURES 2 to 5, inclusive, it will be seen that the copper sheathed heating element 25 is mechanically secured, as by swaging, to a metal flanged collar 35, desirably formed of brass, in such a manner that it is held rigid and leak-tight with respect thereto. This flanged collar or flange 35 is held and sealed into and insulated from the tank 21 at the opening 36 by a rubber or rubber-like gasket 37 which is, in turn, held in place by an externally threaded nut 38, desirably formed of steel. The use of such an elastomeric confined gasket 37 engaging two faces, that is, the inner peripheral and top faces of the tank wall at the edge defining the aperture, makes it easier to obtain and maintain leak tight joints. On account of operating the heating element at high power (more than or at least 1500 watts, and desirably as high as or more than 2000 watts) and high heat input per square inch of sheath surface of the heating element (desirably at least 150 watts per sq. in., and not less than 120 watts, and up to as high as 240 watts when the power input is 1500 watts or higher) it is possible to rid the heater sheath of lime deposits by thermal shock at the beginning of each heating cycle and so use a small or minimum size hole in the tank and a small flange on the heating element which passes into said hole. If a low powered heating element were used, it could not be removed from a small hole in the side of the tank after lime deposits had built up thereon to an extent occurring in practice. That is, in this case, the aperture 36 need be but little larger than the initial size of the heater loop or the body portion of the collar 35 from which the flange extends, as said flange extends outwardly rather than encroaching on the tank aperture. Corrosion protection of the entire water heater is facilitated by the use of a selenium cell or "varistor," here designated 39, between the sheath of the heating element and the tank wall, as compared with the employment by other manufacturers of a conventional fixed resistor at that place, to minimize the loss of galvanic or cathodic protective current from the magnesium or power anode. By the use of a "varistor," this cathodic protective current loss is reduced as compared with that of a conventional resistor because of its inherent properties, illustrated in FIGURE 4, and recognized by manufacturers. See figures 4 and 5, page 6, Bulletin H–2 of International Rectifier Corporation, 1521 E. Grand Ave., El Segundo, Cal., and the graphs on Bulletin No. 264 of Radio Receptor Co., Inc., 240 Wythe Ave., Brooklyn 11, N.Y.

Referring to FIGURE 6, it will be seen that the straight line 41 indicates the current loss with a resistor of conventional construction, that is, one which passes current proportional to impressed voltage. The curved line 42 indicates the current loss when a "varistor" is used in accordance with my invention. Although I suggest the use of a selenium cell as a "varistor" some other device having similar variable resistance properties might be substituted. In general, it is desirable to reduce the current loss from a protective anode to a minimum and at the same time keep the sheath of the heating element from becoming an anode with respect to the tank. This sheath can become corrosively anodic if it has a potential more than .8 volt higher or more positive than that of the tank wall. When such occurs, metal such as copper, of the sheath is corroded away at the area where it comes close to the tank wall and heating element failures result. By bleeding off this charge through a resistor or a "varistor," such corrosion is prevented.

However, in the case of a plain resistor, current to the extent of about 2 ma. (milliamperes) is lost from the cathodic protection system before the sheath of the heater element has reached the positive .8 volt critical value, or that at which galvanic corrosion starts. With a "varistor" of my invention, current losses are kept to a fraction of a milliampere up to the point of criticality, at which point the current is allowed to travel through the "varistor" to an almost unlimited extent in its attempt to keep the sheath at a point below the critical potential. Thus a "varistor" acts like an electrical relief valve set at a predetermined potential; whereas a plain resistor acts as an orifice in a tank, allowing leakage to occur in proportion to the applied pressure.

The mechanical construction of this "varistor" assembly is shown more clearly in FIGURES 2, 3, 4 and 5. The selenium cell 39, which acts as a "varistor," is shown separated from the other parts in FIGURE 4. This is constructed as a selenium coating on the top of a piece of aluminum. It is pressed against the brass flange 35 by a curved plate spring 43, the ends of which are engaged by tabs 44 projecting inwardly from a ring or washer 45 of brass or other durable metal. The steel nut 38 makes electrical contact with this washer and from there current may flow on to the tank wall through a threaded collar 46 projecting outwardly from said wall, secured thereto as by welding, indicated at 47, and encircling the aperture 36.

The brass washer 45 is prevented from electrical contact with the flange 35 by an insulating washer 48 interposed between the washer 45 and said flange. Thus, it will be seen that current can flow from the heating element sheath 26, through its brass flange 35, the selenium cell 39 pressed thereagainst, the spring 43, the brass washer 45, the nut 38 and the collar 46 to the tank 21. Thus the regulating effect of the "varistor" characteristics of the cell are utilized.

The specific construction of the heating arrangement of the illustrated embodiment is that terminals such as blocks 49, of suitable metal as steel, are staked to the pins 51 to which the opposite ends of the heating coil 28 are respectively secured. Power connections with these terminal blocks may be made by screws 52 threaded thereinto. A desirably phenolic insulator 53 with appropriate channels 50 is slipped over the assembly of the terminals 49, the "varistor" cell, washers and spring, as shown most clearly in FIGURES 2, 3 and 5, and secured in place by suitable means. The insulator 53 serves to keep all the parts from shorting. It has an outstanding flange 54, between the apertures which receive the terminal blocks, to prevent shorting between the connecting screws 52.

In the embodiment of FIGURES 7 and 8 there is a similar construction, except that the heater loops are duplicated. Thus, the heater loop 25 lies parallel to a similar heater loop 55, and there are a pair of power connecting screws 56 for this other loop in addition to the screws 52 for the loop 25. In this embodiment, the flat outstanding flange 54 is replaced by a cross-shaped projection 54′ which performs a similar function.

The embodiment of FIGURES 9, 10 and 11 is similar to that of the first embodiment, except that instead of the flange 35 of the heater 25 being secured by the nut 38, there is a mounting flange or sheet metal bracket 57, desirably of steel, shaped generally square in plan or, as shown in FIGURE 11, desirably provided with arms 58 to hold the thermostat 32 against the wall of the tank 21'. Such a method of attachment allows the attached boss or member 46', used instead of the threaded collar 46, to be arc or projection welded at 61, or at 62 at the two corners only of the collar 46' where it engages a cylindrically curved surface of such a tank 21', as illustrated in FIGURES 12 and 13. The bracket 57 is to be secured thereto, as by four screws 59 fitting apertures 60 and threaded into the member 46'. When these screws are turned in, they, like the nut 38 of the first embodiment, compress the rubber gasket 37 to just the correct amount for adequate sealing of the element to the tank 21'. The internal tank pressure tends to tighten the seal and makes it unnecessary to use strong mechanical force to obtain a leak-tight joint at the flange element 35. Except as otherwise specifically described, this embodiment may be constructed like the first embodiment.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In combination, a vessel to contain liquid, an electric heating element of the sheathed type extending into said vessel to be immersed in said liquid, means insulatingly mounting said heating element on a wall of said vessel, an element electropositive with respect to and secured to and inside and in electrical contact with said vessel, to be immersed in said liquid, and a resistor of resistance value decreasing as impressed voltage increases, disposed between the sheath of said heating element and said vessel, for allowing only a predetermined amount of unidirectional current to flow.

2. In combination, a vessel to contain liquid, an electric heating element of the sheathed type extending into said vessel to be immersed in said liquid, means insulatingly mounting said heating element on a wall of said vessel, a sacrificial anode secured inside and in electrical contact with said vessel, to be immersed in said liquid, and a resistor of resistance value decreasing as impressed voltage increases, disposed between the sheath of said heating element and said vessel, to limit the flow of corrosion-inhibiting galvanic current.

3. In combination as recited in claim 2, wherein the sacrificial anode is formed of magnesium.

4. In combination, a vessel to contain liquid, an electric heating element of the sheathed type extending into said vessel to be immersed in said liquid, means insulatingly mounting said heating element on a wall of said vessel, an element electropositive with respect to and secured to and inside said vessel, to be immersed in said liquid, and a selenium cell allowing a predetermined strength of unidirectional current to flow between the sheath of said heating element and said vessel, to limit the flow of corrosion-inhibiting current.

5. In combination as recited in claim 4, wherein the electropositive element is a magnesium anode.

6. In combination as recited in claim 4, wherein the electropositive element is a platinum-faced powered anode of a material selected from the group consisting of tantalum and titanium.

7. In combination, a vessel to contain water, an aperture in a wall of said vessel, a collar outstanding from said vessel and encircling said aperture with all parts thereof beyond its periphery, an electric heating element of the sheathed type extending through said aperture and into said vessel to be immersed in contained water, a flanged collar fixedly secured to the outer end portion of said heating element, a rubber-like gasket disposed directly between said flanged collar and engaging two faces of the vessel wall at the edge defining the aperture, the ends of said heating element terminating in contact members, an insulator apertured to fit over said contact members, and threaded means associated with said insulator, and engaging with said flanged collar, to compress the rubber-like gasket directly against the vessel wall thereby allowing for an aperture of minimum size and securing the heating element assembly in place leak-tight with respect to said vessel wall and electrically insulated therefrom.

8. In combination, a vessel to contain water, an aperture in a wall of said vessel, a collar outstanding from said vessel and encircling said aperture with all parts beyond its periphery, an electric heating element of the sheathed type extending through said aperture and into said vessel to be immersed in contained water, a flanged collar fixedly secured to the outer end portion of said heating element, a rubber-like gasket disposed directly between said flanged collar and engaging two faces of the vessel wall at the edge defining the aperture, the ends of said heating element terminating in contact members, an insulator apertured to fit over said contact members, and a nut surrounding said insulator and connecting with said outstanding collar, whereby tightening of said nut acts on said collar and compresses the rubber-like gasket directly against the vessel wall, thereby allowing for an aperture of minimum size and securing the heating element assembly in place leak-tight with respect to said vessel wall and electrically insulated therefrom.

9. In combination, a vessel to contain water, an aperture in a wall of said vessel, an internally-threaded collar outstanding from said vessel and encircling said aperture, an electric heating element of the sheathed type extending through said aperture and into said vessel to be immersed in contained water, a flanged collar fixedly secured to the outer end portion of said heating element, a rubber-like gasket disposed between said flanged collar and the edge of the vessel wall defining the aperture, the ends of the heating element terminating in contact members, an insulator apertured to fit over said members, a resistor passing current to an increasingly larger proportion as the voltage impressed thereon increases disposed on top of said flanged collar, a spring with inwardly extending tabs engaging said resistor, an insulating member disposed between said spring and said flanged collar, said resistor and spring being held in place on said flanged collar by said insulator, and electrically conductive clamping means surrounding said insulator and connecting with said internally-threaded collar, whereby tightening of said clamping means compresses the rubber-like gasket and secures the heating element assembly in place leak-tight with respect to the vessel wall and electrically insulated therefrom.

10. In combination, a vessel to contain water, an aperture in a wall of said vessel, a collar outstanding from said vessel and encircling said aperture, an electric heating element of the sheathed type extending through said aperture and into said vessel to be immersed in contained water, said element being operable at such a high power input per square inch of heating surface that lime encrustations on the heating element are driven off by thermal shock at the beginning of each heating cycle, whereby said aperture need be but little larger than the initial size of said element, a flanged collar fixedly secured to the outer end portion of said heating element, a rubber-like gasket disposed between said flanged collar and the edge of the vessel wall defining the aperture, the ends of said heating element terminating in contact members, an insulator apertured to fit over said members, a selenium cell disposed on top of said flanged collar, a metal spring engaging said cell, an insulating member disposed between said metal spring and said flanged collar, and electrically conductive clamping means surrounding said insulator and connecting with said outstanding collar, whereby tightening of said clamping means holds said cell, spring and insulating member in place, compresses the rubber-like gasket and secures the heating element assembly in place leak-tight with respect to the vessel wall.

11. In combination, a vessel to contain water, an aperture in a wall of said vessel, a collar outstanding from said vessel and encircling said aperture, an electric heating element of the sheathed type extending through said aperture and into said vessel to be immersed in contained water, a flanged collar secured at the outer end portion of said heating element, a rubber-like gasket disposed between said flanged collar and the edge of the vessel wall defining the aperture, the end of the heating element terminating in contact members, an insulator apertured to fit over said contact members, a sheet metal bracket fitting over said insulator to act on said flanged collar, provided with arms to hold a thermostat against a wall of the vessel, and means received in and for securing said bracket to said outstanding collar to compress the rubber-like gasket and secure the heating element assembly in place leak-tight with respect to the vessel wall.

12. In combination, a vessel to contain water, an electric heating element extending into said vessel to be immersed in said water, and means impressing at least 1500 watts of power on said element to thereby deliver at least 150 watts per square inch of heating surface in contact with said water, thereby keeping said surface free of lime encrustations from said water.

13. The method of electrically heating water, comprising immersing a sheathed electrical heating element therein and energizing said element by at least 1500 watts of power, the size of said element being such that between 120 and 240 watts is delivered to said water per square inch of its sheath surface, so lime encrustations which develop on said sheath during operation are driven off by thermal shock at the beginning of such heating cycle.

14. The method of electrically heating water, comprising immersing a sheathed electrical heating element therein and energizing said element by at least 1500 watts of power, wherein said element is of such size that at least 150 watts is delivered to said water per square inch of its sheath surface.

15. The method of removing lime encrustations which develop on the sheath of an immersion-type electric water heater comprising during operation impressing on said heater between 120 and 240 watts of electric power per square inch of its sheath surface.

16. In combination, a vessel to contain water, an aperture in a wall of said vessel, a collar outstanding from said vessel and encircling said aperture, an electric heating element of the sheathed type extending through said aperture and into said vessel to be immersed in contained water, a flanged collar fixedly secured to the outer end portion of said heating element, a rubber-like gasket disposed directly between said flanged collar and the edge of the vessel wall defining the aperture, the ends of said heating element terminating in contact members, an insulator apertured to fit over said contact members, threaded means associated with said insulator and engaging with said flanged collar to compress the rubber-like gasket, thereby securing the heating element assembly in place leak-tight with respect to the vessel wall and electrically insulated therefrom, and a resistor passing current to an increasingly larger proportion as the voltage impressed thereon increases, disposed in circuit between said threaded means and said flanged collar.

References Cited in the file of this patent

UNITED STATES PATENTS

| | | |
|---|---|---|
| 855,210 | Stewart | May 28, 1907 |
| 1,875,306 | Williams | Aug. 30, 1932 |
| 2,533,492 | Mekler | Dec. 12, 1950 |
| 2,575,150 | Wellman | Nov. 13, 1951 |
| 2,648,805 | Spenke | Aug. 11, 1953 |
| 2,723,340 | Boggs et al. | Nov. 8, 1955 |
| 2,772,343 | Buehne | Nov. 27, 1956 |
| 2,810,815 | Dicome | Oct. 22, 1957 |
| 2,959,692 | Marx | Nov. 8, 1960 |